Feb. 5, 1929.
F. P. LIVINGSTON
1,700,847
ANGLE COCK
Filed June 25, 1927
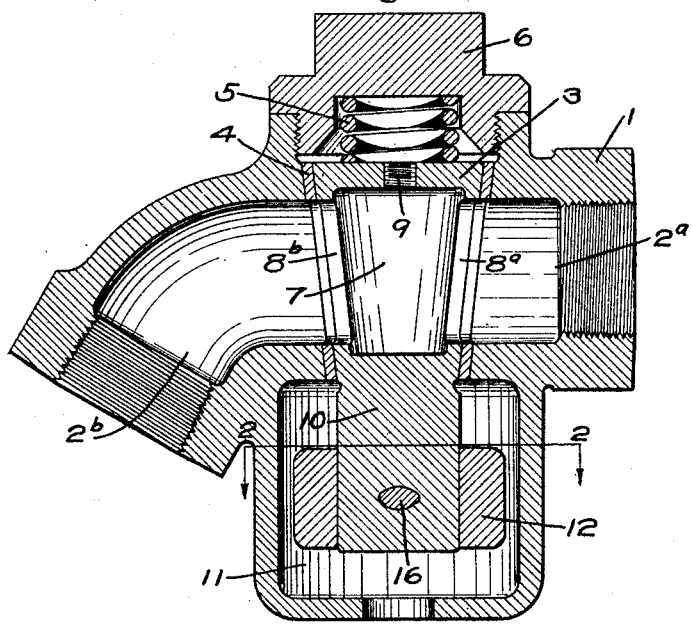
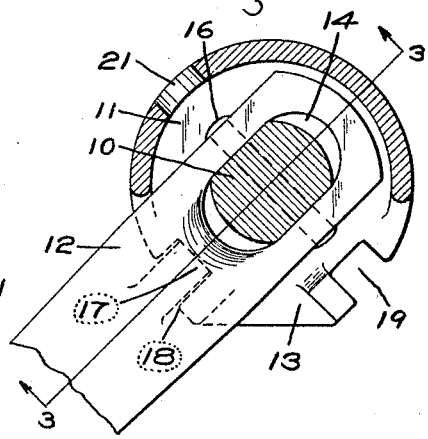
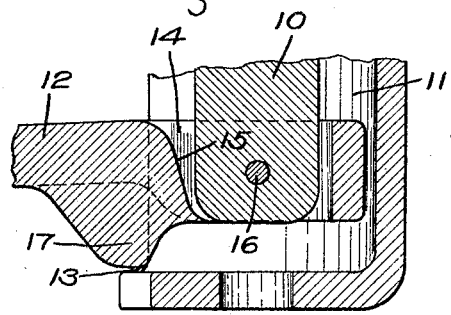
INVENTOR
FREMONT P. LIVINGSTON
BY *Wm. M. Cady*
ATTORNEY Patented Feb. 5, 1929.

1,700,847

UNITED STATES PATENT OFFICE.

FREMONT P. LIVINGSTON, OF DENVER, COLORADO, ASSIGNOR TO THE WESTINGHOUSE AIR BRAKE COMPANY, OF WILMERDING, PENNSYLVANIA, A CORPORATION OF PENNSYLVANIA.

ANGLE COCK.

Application filed June 25, 1927. Serial No. 201,357.

This invention relates to an angle cock device, such as employed in the brake pipe of a fluid pressure brake system at each end of a car, for controlling communication through the brake pipe.

The usual angle cock device has a tapered plug valve, with a squared end portion adjacent the small end of the taper, which plug valve is assembled in the device casing, in such a manner, that said squared end portion extends beyond the casing, on the upper side, for attachment of the usual operating handle. The plug valve is normally held seated in its upper position by the pressure of a spring, interposed between the lower and larger end of the plug valve, and a member having screw-threaded engagement in the casing.

With an angle cock device of such construction, the plug valve can be depressed and thus unseated by pressing downwardly on the operating handle, and when the valve is unseated, any dirt or other foreign material, which may have collected around the exposed end of the plug valve, will fall into the space between said plug valve and its seat, so that when the downward pressure is removed from the plug valve, the dirt particles will prevent the return of the valve to its seat and then when the vale is turned, the dirt particles tends to score the valve and valve seat, which results in leakage of fluid under pressure from the brake pipe to the atmosphere. Furthermore, since the operating handle is located on the upper exposed side of the angle cock, if the handle should happen to turn hard, the operator may use such force to turn the handle as to bend or distort same and possibly render the handle inoperative. In addition, water tends to collect in the spring chamber in the casing below the plug valve and there freeze, making it practically impossible to turn the plug valve in its seat and under such conditions, breakage of the handle often results, in attempting to turn the valve.

The principal object of my invention is to provide an angle cock device of improved construction, in which the above difficulties are avoided.

In the accompanying drawing; Fig. 1 is a vertical, sectional view of my improved angle cock device, said device being shown in its normal open position; Fig. 2 is a section taken on the line 2—2 of Fig. 1; and Fig. 3 is a section taken on the line 3—3 of Fig. 2.

As shown in the drawing, the angle cock device may comprise a casing 1, having a passageway $2^a$, adapted to be connected to the brake pipe proper and a passageway $2^b$, at an angle and adapted to be connected to the usual flexible hose. Controlling communication between passageways $2^a$ and $2^b$ is a tapered plug valve 3 having its larger end uppermost, and adapted to seat in a tapered bushing 4, which is pressed in the casing 1. A spring 5, is interposed between the larger, upper end of the plug valve 3 and a plug 6, having screw-threaded engagement in the casing.

The plug valve 3 has a central chamber 7, adapted, in one position, to be connected to passageways $2^a$ and $2^b$ through openings $8^a$ and $8^b$ in the walls of the plug valve and in another position of the plug valve, communication between said passageways is closed. The chamber 7 is connected to the chamber containing spring 5 through an opening 9 in the upper end wall of the plug valve.

Integral with and extending downwardly from the lower small end of the plug valve 3 is a key stem 10, substantially rectangular in shape, the stem extending into a chamber 11 of a downwardly extended portion of the casing. An operating handle 12 extends through an opening 13, formed in the wall of the downwardly extended portion and is provided at one end with an elongated opening 14, adapted to receive the key stem 10 of the plug valve. The opening 14 through the handle is of greater length than the long diameter of the stem 10. The handle is pivotally connected to the stem 10 by a pin 16 and the end wall 15 of the opening 14 is cut away so as to permit upward vertical movement of the handle 12, relative to the stem 10.

The handle 12 has a lug 17, formed on its lower side and adapted to engage in either a notch 18 or a notch 19, cut in the lower wall of the downwardly extended portion of the casing, according to the position of the handle. The handle lug 17 is adapted to be moved out of engagement with the notches 18 or 19 by upward movement of the handle 12.

In order to permit assembly or removal of the fulcrum pin 16, an opening 21 is formed in the vertical wall of chamber 11.

In operation, to turn the plug valve 3 from the open position, as shown in the drawing, to the closed position, in which position, the connection between passageways 2ª and 2ᵇ is cut off, the handle 12 is lifted vertically until the handle lug 17 is out of engagement with the notch 18. The handle is then turned substantially 90°, after which, the operator's hand is removed from the handle and the handle drops by gravity, the handle lug 17 engaging in the notch 19, thereby automatically locking the handle and consequently the plug 3, in the closed position. Turning of the plug valve from the closed to the open position is performed in the same manner as above described, except the direction of turning is reversed.

Since it is necessary to lift the handle 12 vertically, before the handle can be turned, the handle cannot be accidentally or unintentionally turned, as will be evident.

Water can not collect in the chamber containing the spring 5, due to its position relative to the chamber 7 in the plug valve, and since the chamber 11 containing the plug valve extension 10, is drained through the opening 13, there is no means whereby moisture can collect and form ice in a sufficient quantity to interfere with the operation of the device. Furthermore, since the extension 10 is protected and the handle 12 is located on the under side of the device, neither is subject to the abuse, hereinbefore described, and as a result proper operation of the device is always ensured.

Having now described my invention, what I claim as new and desire to secure by Letters Patent, is:—

The combination with a valve body provided with a downwardly extending portion provided with recesses and having a chamber, of a tapered plug valve mounted in said casing and having a key stem extending into said chamber, and an operating handle pivotally connected to said stem and provided with a lug for engaging the recesses in said downwardly extending portion to prevent rotative movement of the valve.

In testimony whereof I have hereunto set my hand.

FREMONT P. LIVINGSTON.